US008743741B2

United States Patent
Mueller et al.

(10) Patent No.: US 8,743,741 B2
(45) Date of Patent: Jun. 3, 2014

(54) NETWORK RECONFIGURATION METHOD

(75) Inventors: Torsten Mueller, Schwarzenburg (CH);
Herbert Leuwer, Backnang (DE);
Thorsten Kaiser, Backnang (DE);
Thomas Alberty, Backnang (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1144 days.

(21) Appl. No.: 12/673,544

(22) PCT Filed: Aug. 14, 2007
(Under 37 CFR 1.47)

(86) PCT No.: PCT/EP2007/058403
§ 371 (c)(1),
(2), (4) Date: Feb. 9, 2012

(87) PCT Pub. No.: WO2009/021554
PCT Pub. Date: Feb. 19, 2009

(65) Prior Publication Data
US 2013/0194972 A1    Aug. 1, 2013

(51) Int. Cl.
*H04L 12/24*    (2006.01)
(52) U.S. Cl.
USPC ........... 370/255; 370/254; 370/256; 370/242; 370/222; 370/216; 709/223; 709/224; 709/220
(58) Field of Classification Search
USPC ................ 370/255, 254, 256, 216, 242, 228; 709/223, 224, 220
See application file for complete search history.

(56) References Cited

U.S. PATENT DOCUMENTS

| 5,790,808 | A * | 8/1998 | Seaman | 709/223 |
| 6,330,229 | B1 * | 12/2001 | Jain et al. | 370/256 |
| 6,717,922 | B2 * | 4/2004 | Hsu et al. | 370/258 |
| 7,564,779 | B2 * | 7/2009 | Rose et al. | 370/223 |
| 7,804,778 | B1 * | 9/2010 | Begalke et al. | 370/234 |
| 2004/0179524 | A1* | 9/2004 | Sasagawa et al. | 370/389 |
| 2006/0253561 | A1* | 11/2006 | Holmeide et al. | 709/223 |

\* cited by examiner

*Primary Examiner* — Rasheed Gidado

(57) ABSTRACT

A method of reconfiguring a data unit communication network that comprises bridge nodes is described. Each bridge node comprises two or more ports for receiving and sending data units, a controller for controlling said bridge node and for handling received data units, and a record for associating data unit address information with port identification information. The controller is capable of querying said record for determining which one or more ports to forward a received data unit to. The method comprises performing a topology reconfiguration procedure for said data unit communication network when detecting an occurrence of any one of one or more topology reconfiguration conditions, and performing a purge procedure of the records of the bridge nodes when detecting an occurrence of an indication of an upcoming topology reconfiguration of the data unit communication network, the indication being different from any of said topology reconfiguration conditions, and continuing to handle data units in the bridge nodes during the purge procedure.

18 Claims, 8 Drawing Sheets

NETWORK RECONFIGURATION METHOD

TECHNICAL FIELD

The present invention generally relates to the field of bridged network systems, and more specifically to a method of reconfiguring a data unit communication network comprising bridge nodes, to a bridge node for such a data unit communication network and to method of controlling such a bridge node.

BACKGROUND

In the field of data communication, it is known to provide networks for transporting data units that have a logical structure according to which transport systems (such as e.g. Local Area Networks or LANs) are interconnected by bridge nodes, in order to form one overall network for transporting data units to and from any end nodes that are communicating with any one of the transport systems. The bridge nodes comprise two or more ports, each connected to a transport system. FIG. 2 shows a schematic example of such a network, in which 22, 23, 24, 26 and 28 denote bridge nodes, P denotes a port, and 21, 25, 27, 29 and 30 denote LANs as examples of transport systems. End nodes are not shown for simplicity. FIG. 3 shows a different configuration of bridge nodes 31 to 37, namely a ring configuration. The lines between the ports P represent the transport systems interconnected by the bridge nodes. Each of the shown examples can be a complete network or only a part of a larger system of bridge nodes and transport systems. For example, the bridge nodes 22, 24, 26 and 28 in FIG. 2 together form a ring configuration, and the nodes shown in FIG. 3 could be such ring in a larger system.

A controller in each bridge node handles the data units received at a given port, in order to determine the port out of which to forward the data unit, or whether e.g. to drop the data unit (for example because it is defective). The operation of forwarding a data unit can be done with the help of a record that associates data unit address information with port identification information. The controller then queries the record for identifying the port out of which to send a received data unit, using the address information in the data unit as a reference.

It is furthermore known to provide a learning procedure in the bridge nods, according to which the bridge node's record is updated on the basis of source address information contained in data units received at the ports. Namely, these source addresses are associated in the record with an identifier of the port at which the data unit arrived. If later a data unit arrives having that address as a destination address, then the data unit can be correctly forwarded to the correct port.

An example of a network using bridge nodes in this way is a layer 2 network using Medium Access Control (MAC) bridges according to IEEE standard 802.1 D. The filtering databases (FDBs) used in such MAC bridges are examples of the above mentioned records.

In networks of the above mentioned kind, which use records for handling data units in bridge nodes, it is furthermore known to purge such records in the event of a network topology reconfiguration. In other words, when the topology changes, e.g. due to a failure or shutting-down of a component (such as a bridge node or a transport system), then the information in the records becomes obsolete and should be reset.

In known systems, such as according to the IEEE 802 standard family, the reconfiguration is performed by first detecting the occurrence of a topology reconfiguration condition (e.g. that a transport system is disabled), then changing the topology and finally purging or flushing the records in the bridge nodes. Using the learning procedure, these records can then be built up again for the new topology.

During the process of reconfiguration, the handling of data units in the bridge nodes is continued, but with the old records derived on the basis of the old topology, such that data units are not correctly routed and effectively traffic is disrupted. This period of disruption of the network is also referred to the total recovery time of the network for reconfiguration. It comprises the time for detecting the topology reconfiguration condition, the time for letting the network converge to a new topology and the time for purging the records.

The object of the present invention is to provide an improved system and control method for the above described types of network, especially in view of making it possible to reduce the total recovery time.

SUMMARY

This object is solved by the methods and systems of the independent claims. Advantageous embodiments are described in the dependent claims.

The invention can be applied to a method of reconfiguring a data unit communication network that comprises bridge nodes, where the method comprises performing a topology reconfiguration procedure for said data unit communication network when detecting an occurrence of any one of one or more topology reconfiguration conditions. According to the invention a purge procedure of the records of said bridge nodes is performed when detecting an occurrence of an indication of an upcoming topology reconfiguration of said data unit communication network, said indication being different from any of said topology reconfiguration conditions, and the handling of data units in said bridge nodes is continued during the purge procedure.

Therefore, the invention proposes to conduct a dedicated purge procedure that is separate from the topology reconfiguration procedure and which is triggered by an indication that a topology reconfiguration is coming up. This indication (e.g. an indication that maintenance of a bridge node or of a transport system will be conducted in a certain number of seconds) is different from the condition that triggers the reconfiguration procedure (e.g. the actual shutting down of a bridge node or transport system), such that the dedicated purging or flushing of the records is not the one possibly conducted as a part of the reconfiguration procedure. Namely, the dedicated purging is triggered by an indication that a reconfiguration will soon occur, i.e. before a reconfiguration condition.

In this way, the purging of records of the bridge nodes is begun before the topology reconfiguration is triggered, and thus the purging step at the end of the topology reconfiguration procedure can be omitted, thereby reducing the total recovery time. Even if a purge step continues to be executed at the end of the reconfiguration procedure, the time it consumes is greatly reduced in comparison to the prior art, as all records have already been deleted just before, such that the process is almost instantly finished. In contrast, in the prior art the records or data bases can be quite extensive, such that the process of deleting can take several seconds for each record. Therefore, the concept of the invention provides the effect of enabling a reduction of the total recovery time.

BRIEF DESCRIPTION OF FIGURES

In the following, detailed embodiments of the invention will be described with reference to the figures, in which.

DETAILED DESCRIPTION OF EMBODIMENTS

In the following, reference will sometimes be made to bridged networks according to the IEEE 802.1 family of standards. The invention can indeed be advantageously applied to networks of this kind, but is not restricted thereto. Rather, the invention can be applied in the context of any data unit communication network that comprises bridge nodes and where each bridge node comprises two or more ports for receiving and sending data units, a controller for controlling the respective bridge node and for handling received data units, and a record for associating data unit address information with port identification information, the controller being capable of querying said record for determining of its ports to forward a received data unit to, as well as being arranged for performing a topology reconfiguration procedure when detecting an occurrence of a topology reconfiguration condition.

Figure 1:
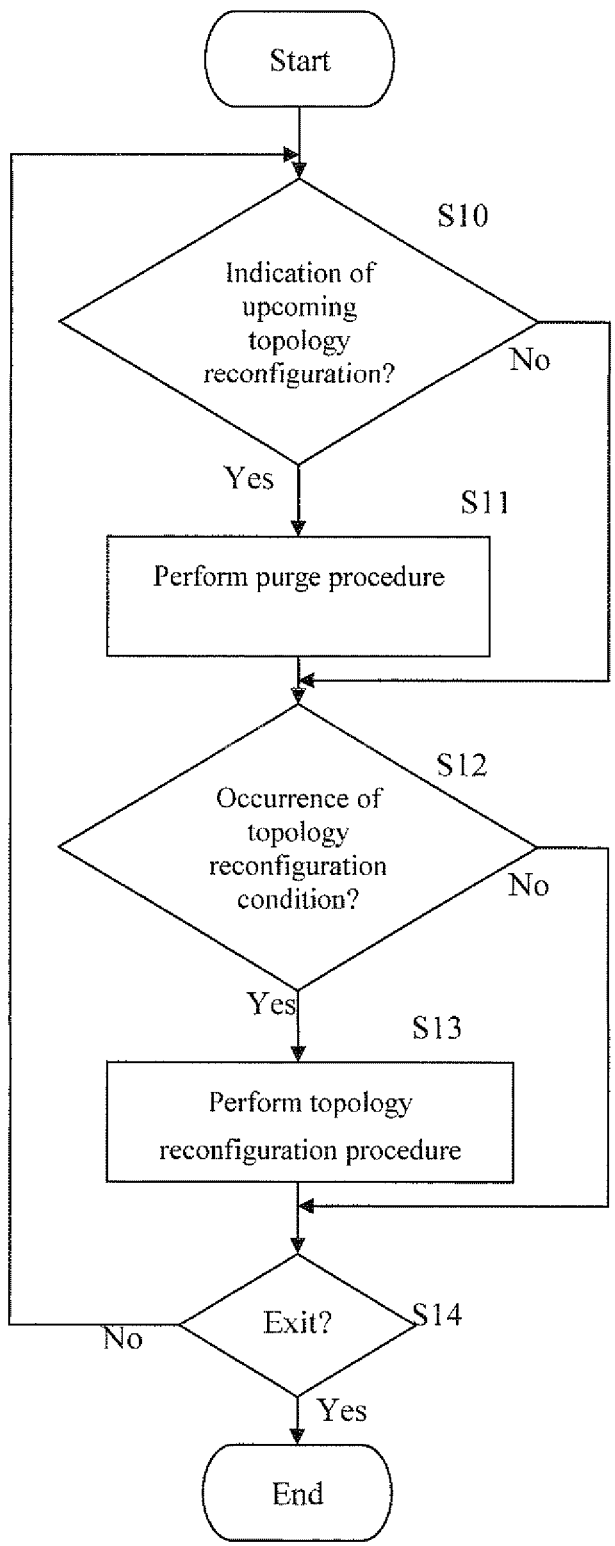
FIG. 1 shows a flowchart of an embodiment of a method of the invention relating to control of a network that comprises a plurality of bridge nodes.
Figure 2:
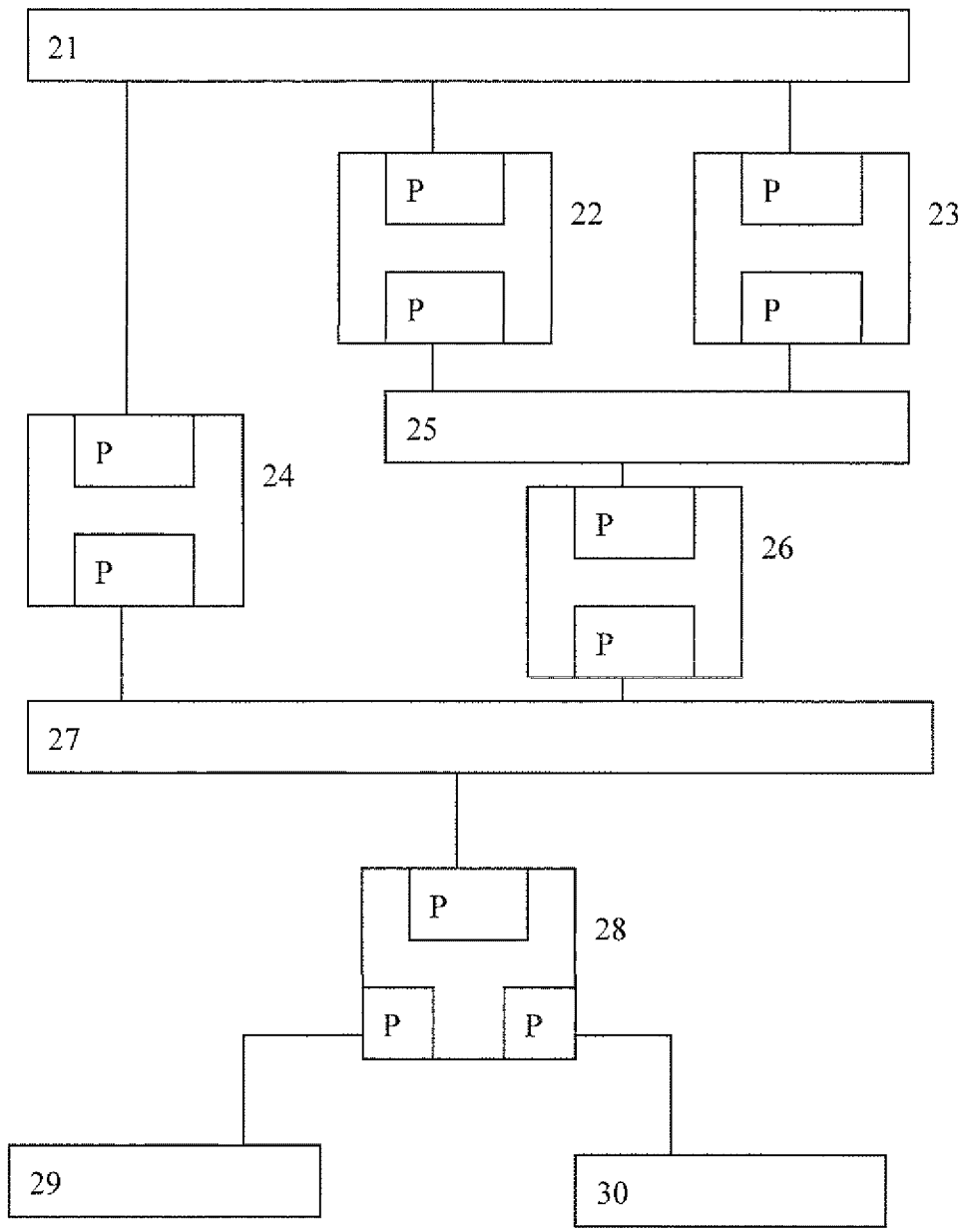
FIG. 2 shows a first example of a network comprising bridge nodes and transport systems.

A basic embodiment for controlling the reconfiguration of a data unit network comprising bridge nodes is shown in FIG. 1. The term "data unit" is used generically for describing any subdivision of data to be sent into portions, and such data units have different names depending on the protocol and the technical context, such as packet, frame, cell, protocol data unit, segment, etc. The term "data unit" is intended to describe any such subdivision of sending data.

During operation of the network, i.e. while it is forwarding data units through the system, a network control procedure as shown in FIG. 1 can be conducted. In a step S10 it is determined whether an indication of an upcoming topology reconfiguration is present.

Conditions for a topology reconfiguration can e.g. be failure (such as a hardware or software failure of a node, or communication disruption of an interconnecting transport system) of a component (a component can be a single node or a group of nodes, with or without interconnecting transport systems, up to an entire network part) of the data unit communication network, and/or shut-down of a component of the data unit communication network.

The indication that any such a condition for topology reconfiguration is impending can be chosen in any suitable or desirable way. For example, an indication of an upcoming topology reconfiguration of the data unit communication network can be one or more of: signal quality degradation, a a maintenance indication, and a system update indication. An example of a signal quality degradation as an indication for an upcoming topology change can be the observation of the signal-to-noise ratio (SNR) on a link that is prone to interruptions due to periodic interferences, e.g. observing the SNR on a wireless link in order to conclude that when the SNR falls below a certain threshold, some form of fading is occurring (e.g. rain fading) and that a complete disconnection (i.e. a topology reconfiguration condition) will follow. A maintenance indication can e.g. be a message from a central control entity that a node is going to be serviced. The maintenance indication may also be input at a node by service engineer. Similarly, an update indication for informing of an upcoming software update in a bridge node or a transport system can be a message provided by a central control entity or by a maintenance engineer at the update location.

If the outcome of step S10 is "YES", then a dedicated purge procedure S11 is conducted for purging the records of at least those nodes that will be affected by the upcoming topology change. The purging can consist in the complete deletion of all entries pertaining to an association of data unit address information and port identification information for all ports in the affected bridge nodes, or it can be more limited, e.g. only deleting the entries of affected ports.

During the purge procedure, the bridge nodes involved continue to handle data units, i.e. they do not cease to operate as data unit routers and filters. This can be accomplished e.g. by letting the bridge nodes handle data units like in a default mode in which no record is available. Such a default mode is e.g. a flooding mode, i.e. a mode in which received data units are simply sent to all ports of the bridge node. Although such a default mode is not as efficient as operating with a well established record or data base that associates port identification information with data unit address information, it is better than no operation at all. The difference in effectiveness will also depend on certain factors in the network, i.e. the momentary traffic load.

If the outcome of step S10 is "NO", then step S11 is skipped and the procedure passes to step S12. Step S12 determines whether a topology reconfiguration condition is present, e.g. one of the above mentioned conditions. If the outcome is "YES", then a topology reconfiguration procedure S13 for the network is conducted. If the outcome is "NO" then step S13 is skipped. The procedure continues until an exit step S14 is conducted.

The procedure S13 can be done as is known from the prior art. The process of topology change and convergence to a new topology requires stopping the routing and filtering operation of the bridge nodes. The procedure S13 may or may not comprise a step of purging the records of the affected bridge nodes at the end. If a possibility for omitting a purging or flushing step at the end of the reconfiguration procedure S13 is desired, then it should be conditional on whether or not the dedicated flushing procedure S11 was previously performed. If S11 was performed, then the purging step in procedure S13 may be omitted, but if no dedicated purging S11 occurred previously, then a purging step should be executed at the end of S13. This is due to the fact that the detection of a topology reconfiguration condition in S12 does not necessarily mean that an indication of an upcoming topology change was detected in step S10. Namely, there exist topology reconfiguration conditions that can not be foreseen, e.g. in a protection case after hardware defects.

Consequently, a simpler arrangement of the invention can be accomplished by always providing a purge step as a part of the topology reconfiguration procedure S13. In this way, standard implementations of the topology reconfiguration procedure can also be retained without change.

It is noted that the control signalling for controlling the individual affected bridge nodes can be done in any suitable and desirable way. For example, it can be accomplished by a central control entity that communicates with all of the bridge nodes of the network. The control can also be accomplished with the help of one or more topology control protocols, where each of the bridge nodes implements the protocol(s) and runs one or more instances. These topology control protocols use dedicated control data units. Examples of such protocol are STP (Spanning Tree Protocol), RSTP (Rapid Spanning Tree Protocol) and MSFT (Multiple Spanning Tree Protocol) known from the IEEE 802 standard family. These protocols use so-called BPDUs (Bridge Protocol Data Units) as dedicated control data units. Examples of systems using a control protocol will be discussed further on with reference to FIGS. 7 and 8.

In such cases in which the occurrence of a topology reconfiguration condition can be foreseen by detecting an appropriate indication beforehand, the present invention achieves the advantage of potentially reducing the purge time in the reconfiguration procedure S13, because even if such a purge time is still present in S13, it is typically much shorter than in prior art situations, because the records in the affected bridge nodes have already been purged previously in the dedicated purge procedure S11. In contrast, in the prior art the records or data bases can be quite extensive, such that the process of deleting can take several seconds for each record. Therefore, the concept of the invention provides the effect of enabling a reduction of the total recovery time.

As already mentioned in the introduction of the application, it is known to perform a learning operation in bridge nodes, wherein the data unit source address information of an arriving data unit is associated with port identification information of the port at which it arrives. In known bridge nodes this learning operation is performed continuously as long as the node is routing and filtering data units.

Such a learning procedure can also be conducted as a part of the designated purge procedure (S11) of the present invention. It is noted that the associations that will be learned during the designated purge procedure will generally not be useful for the future, due to the expected reconfiguration. But as long as the topology reconfiguration procedure (S13) comprises its own purge step at the end, the newly recorded association during the dedicated purge procedure will be deleted after reconfiguration. The effects of the present concept can still be achieved, because the amount of data built up in the records or data bases of the bridge nodes during such a learning procedure in the dedicated purge procedure will generally be small, such that the process of deletion at the end of the topology reconfiguration procedure will still be very quick compared to the deletion of a record that was built up over a long period of time.

Nonetheless, according to a preferred embodiment of the invention, it is proposed to introduce a new concept of a learning state that can be associated with each port of a bridge node, where this state can assume at least two values, namely on or off. If the learning state is on for a given port, then the bridge node's record is updated on the basis of information contained in data units received at that given port. It is furthermore proposed that the dedicated purge procedure comprises disabling the learning state for one or more of the ports of the bridge nodes. In other words, during the dedicated purge procedure, it is preferred that some or all of the ports in bridge nodes affected by the expected reconfiguration be set into a non-learning state (i.e. learning state="no"), such that the corresponding record (which is just being purged) is not rebuilt during the dedicated purge procedure, at least not with respect to the ports affected by the expected reconfiguration.

It is desirable that the disabled learning state of ports be re-enabled after the topology has been reconfigured and normal operation sets in again. This can be achieved in any suitable or desirable way. For example, the topology reconfiguration procedure may comprise a step of enabling the learning state after reconfiguration for those ports of the bridge nodes that had the learning state disabled during the dedicated purge procedure. For example, each bridge node may be controlled to set the learning state of its ports back to "on" after the final purge step P shown in the figure at the bottom. The end of reconfiguration can basically be detected when the appropriate control message informing of a topology change is received. In the context of IEEE 802.1 this is a BPDU carrying a marker TP (TP=Topology Change).

Alternatively or additionally the entire control procedure may comprise a step of enabling said learning state for ports of said bridge nodes whose learning state had been disabled upon expiration of a timer. This could be achieved with the help of individual timers in the bridge nodes or in a central control entity, which are set individually when the respective learning state is disabled, or with a central system timer that is set when a given port (such as the first or last to be disabled) is set into the disabled learning state. The timer may be triggered in any suitable way, e.g. when the disablement of the learning state occurs, or when the purging begins, or when then purging ends.

Figure 3:
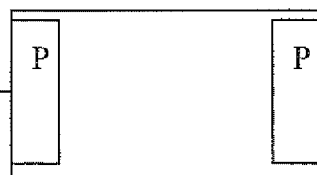
FIG. 3 shows a second example of a network comprising bridge nodes and transport systems.
Figure 3:
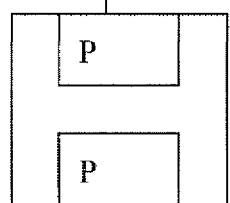
Figure 3:
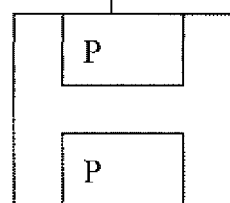
Figure 3:
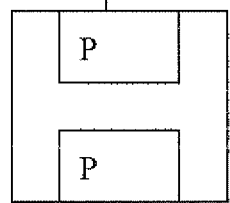
Figure 3:
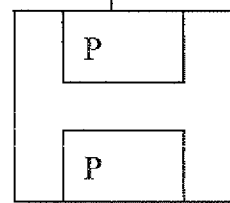
Figure 3:
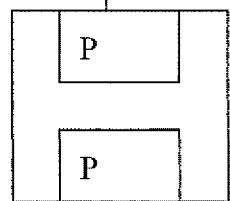
Figure 3:
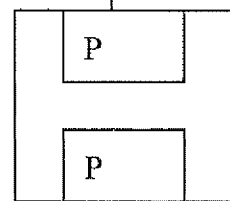

Now examples of the invention will be described cases in which the bridge nodes implement a topology control protocol that uses associated topology control data units for signalling between the bridge nodes. More specifically, message sequence charts for signalling between bridge nodes having an arrangement as shown in FIG. 3 will be discussed by referring to FIGS. 6 to 8. FIG. 3 shows a loop arrangement of bridge nodes which could be a complete network or a part of a larger network, as explained previously. For the examples, it will be assumed that the topology control protocol (e.g. STP, RSTP, MSTP) has operated to block traffic at the lower port of node 35, which is shown as 600 in FIGS. 6 to 8. It should be noted that this is a logical block designated by the protocol operation, in order to avoid a topological loop. In other words, the lower port of node 35 is logically blocked in order to avoid loop traffic in the physical loop structure.

L1 to L7 represent transport systems that are bridged by the bridge nodes 31 to 37. L1 to L7 can be proper networks themselves, such as LANs. The transport systems are nor shown in FIG. 3 for simplicity. It is noted that the concept of the invention is particularly well applicable when the transport systems are point-to-point LANs.

Figure 6:
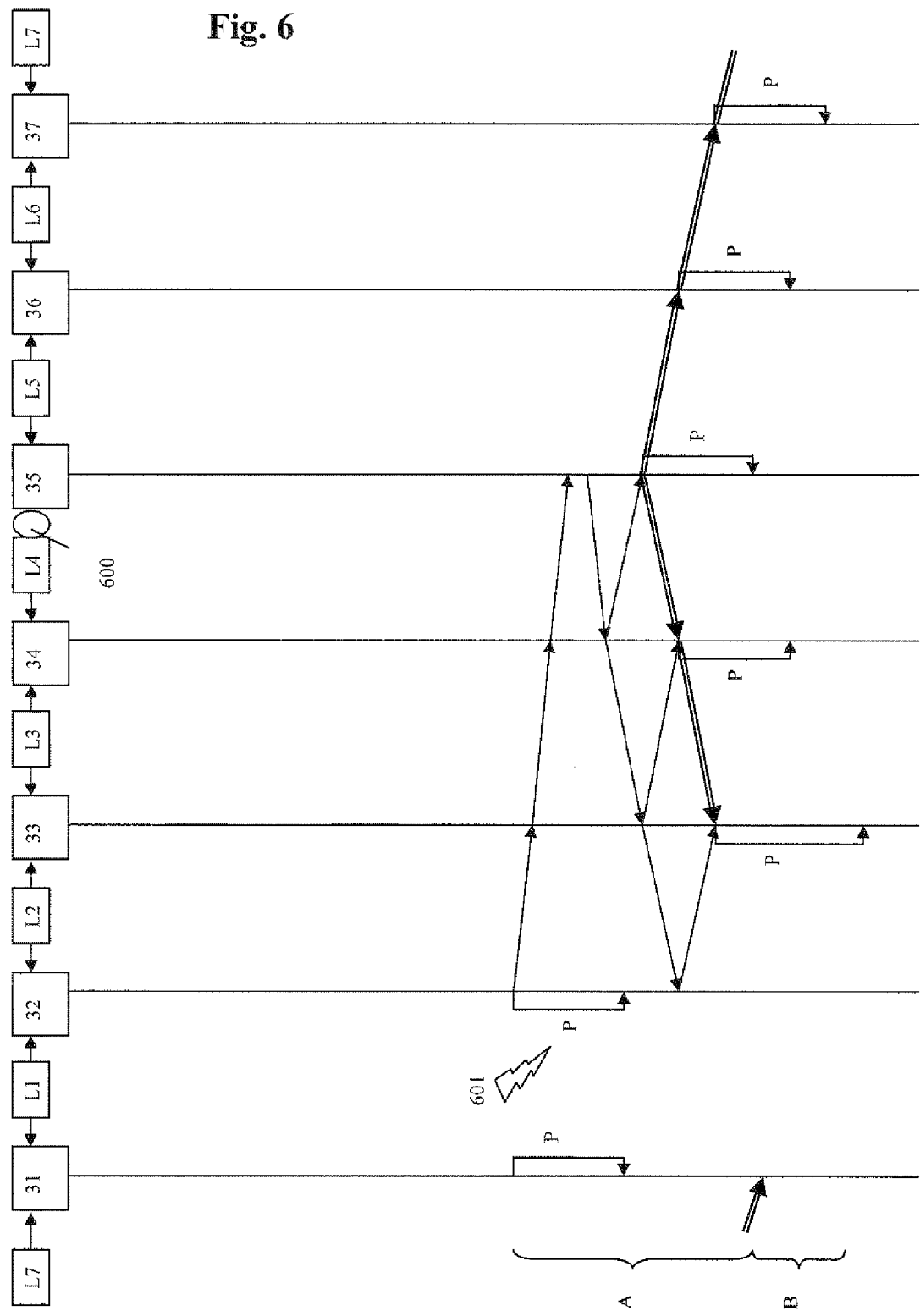
FIG. 6 shows a message sequence chart for an example of a topology reconfiguration procedure according to the prior art.

FIG. 6 shows a topology reconfiguration procedure according to the prior art, as it would e.g. be performed by instances of one of the above mentioned protocols STP, RSTP or MSTP. Bridge nodes 31 and 32 detect a shut-off of transport system L1 (e.g. a LAN) that connects these nodes, see disruption 601. As a consequence, nodes 31 and 32 purge their records or data bases (see P in the Figure) and node 32 initiates the reconfiguration procedure for the affected network nodes.

This is done by sending appropriate signalling messages shown as arrows in the figures, where each node that receives such a signalling message reacts according to the underlying control protocol, i.e. with its own signalling messages, which overall leads to the shown cascade of messages. (It is noted that FIGS. 6 to 8 only show that part of signalling pertaining to the reconfiguration or purging; the control protocol will generally at the same time provide for the sending of other signalling messages for other purposes, which are not shown here for simplicity). The actual topology change in the example occurs when node 35 receives the signalling, as the reaction will be the unblocking of the node towards transport system L4, in order to be able to route the traffic through L4 instead of through L1. The ensuing control messages lead to purging steps in the other nodes 33 to 37. More specifically, the double line arrows signify special control messages that carry an indicator of a topology change. In the context of IEEE 802.1, these are BPDUs that carry the so-called TC marking (TC=Topology Change). It is furthermore noted that a purging symbol on the right hand side of a line symbolizes the purging of the record with respect to entries relating to the port on the right-hand side of the respective bridge node, and purging symbol on the left-hand side of a line symbolizes the purging of the record with respect to entries relating to the port on the left-hand side of the respective bridge node It can be seen that the topology convergence time A extends from the detection of the disruption 601 to the arrival of the control message at node 31 that was sent by node 37. The purging of all records requires the additional period B, such that the total recovery time is A+B.

Figure 7:
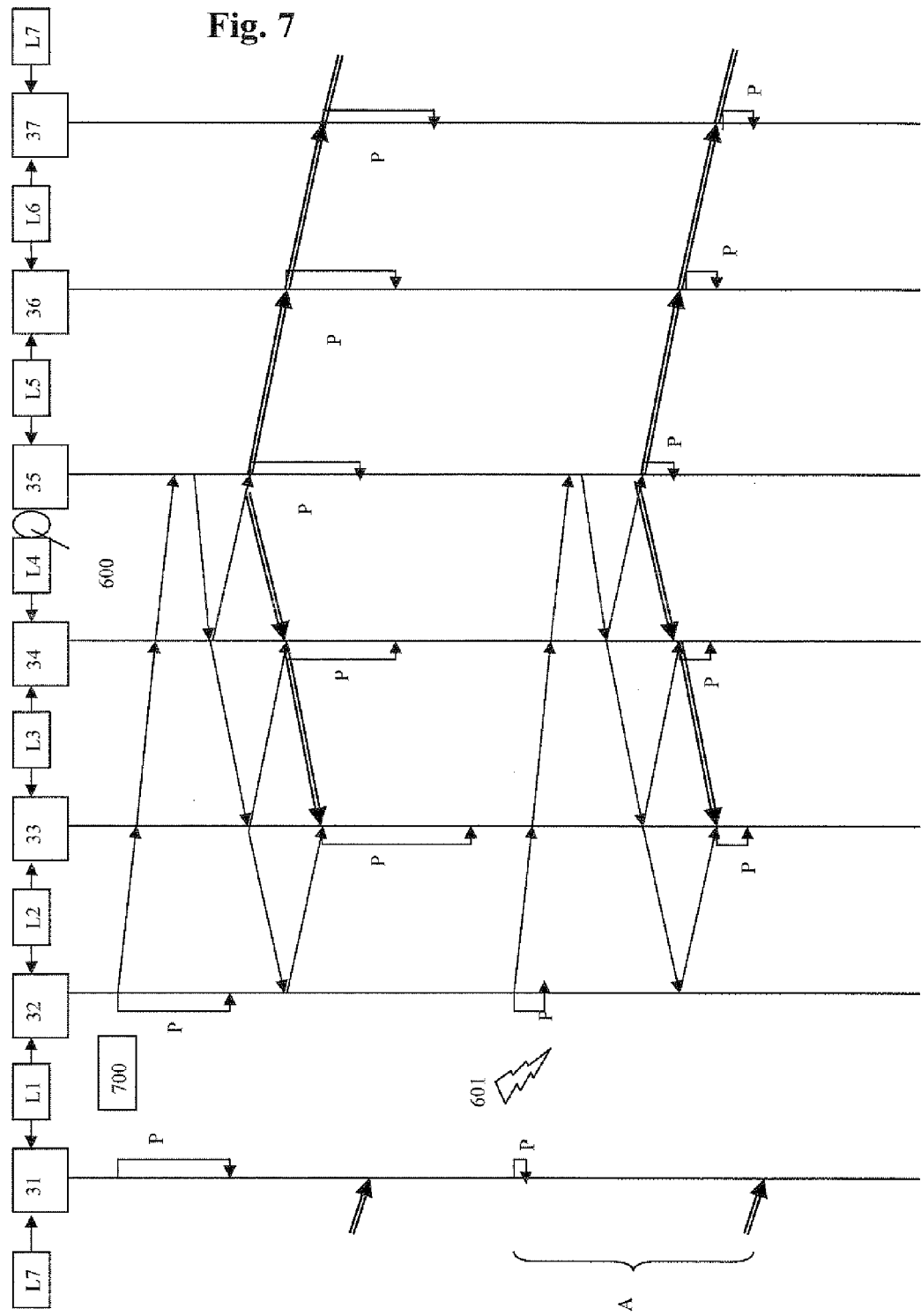
FIG. 7 shows a message sequence chart for an example of a purge procedure according to an embodiment of the present invention.

FIG. 7 shows a first embodiment of the present invention, in which each bridge node runs a first and a second instance of the topology control protocol in parallel. The first instance is arranged to conduct steps for the topology reconfiguration procedure in each respective bridge node and the second instance is arranged to conduct steps for the purge procedure in each respective bridge node. In FIG. 7 nodes 31 and 32 receive an indication 700 of the upcoming shut-down of transport system L1 in a predetermined number of second, e.g. a maintenance message. The nodes are running a second instance of the topology control protocol, which second instances conduct the purge procedure described as S11 in connection with FIG. 1. Preferably, when the purge P is conducted with respect to a given port, the learning state of that port is then set to non-learning (i.e. learning state="no").

The topology reconfiguration procedure (S13 in FIG. 1) is like in FIG. 6, such that no further explanation is necessary. When the disturbance 601 occurs, the appropriate control messages are sent.

The second instances can be arranged to mimic the action of the first instances, except for the actual reconfiguration. In other words, the second instances can perform a similar signalling in response to the indication 700 as the first instances perform in response to disturbance 601, but the second instances do not reconfigure the topology. The control messages sent according to the topology control protocol can contain markers or flags that allow distinguishing between the different instances. For example, the MSTP can distinguish up to 64 instances.

As can be seen, the second instances perform a purging P the records in the affected nodes. Consequently, when later the purging P is conducted in the topology reconfiguration procedure by the first instances, this purging is very quick, as the records had already been purged previously. Consequently, there is virtually no supplementary time B and the total recovery time is determined by A, i.e. shorter than in the example of FIG. 6.

Figure 8:
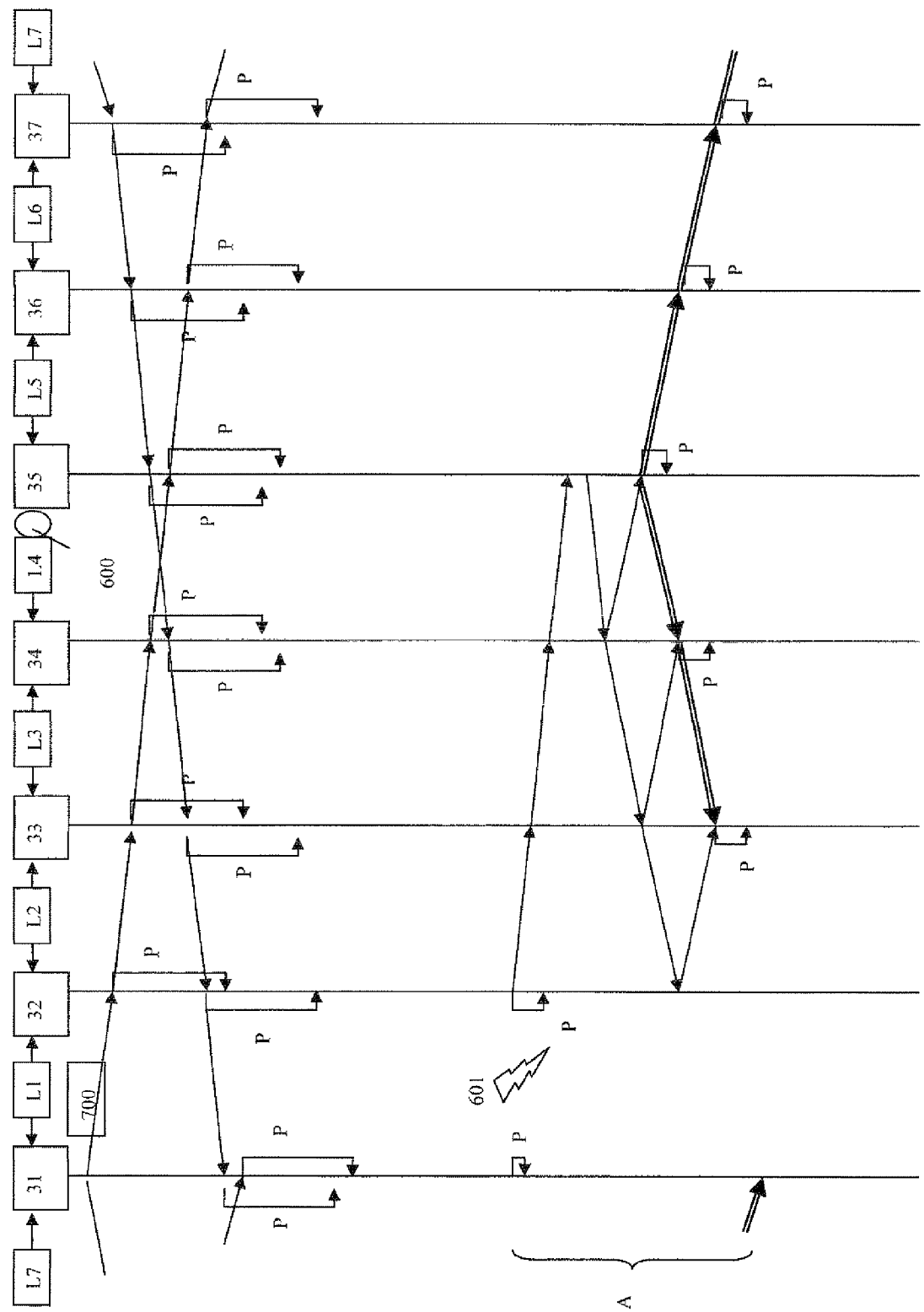
FIG. 8 shows a message sequence chart for an example of a further purge procedure according to an embodiment of the present invention.

FIG. 8 shows another example, which can be conducted alternatively or together with the functionality described in connection with FIG. 7. In FIG. 8 the indication 700 leads to a cascade of simple control messages that contain a special marking or flag that informs the receiver to purge its record with respect to the port at which the control message arrived and to send a corresponding control message out of its other ports. Preferably, the port is then also set into a state on non-learning (learning state="no"), as previously described.

The dedicated purge procedure ends when the enacting nodes 31 and 32 receive this type of control message back from the neighbouring nodes. In this example, no second instance of the topology control protocol is necessary.

On the other hand, just like in the example of FIG. 7, the purging time at the end of the topology reconfiguration procedure is short, such that the total recovery time is shorter than in the case of FIG. 6.

Figure 5:
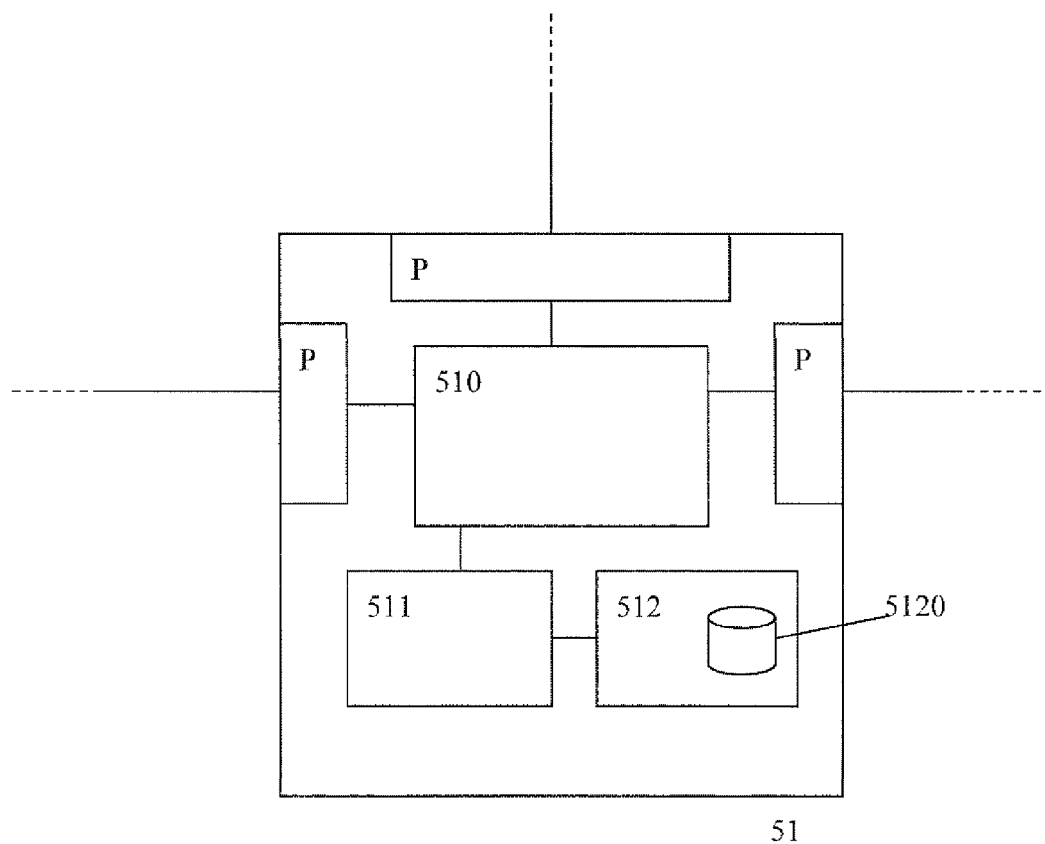
FIG. 5 shows a schematic example of a bridge node according to an embodiment of the present invention.

FIG. 5 shows a schematic example of a bridge node 51 according to an embodiment of the invention. It comprises ports P, a data unit buffer 510, a controller 511, such as a processor, and a memory 512, which comprises a record 5120. For example, the record can comprise a filtering data base (FDB) as known from IEEE 802.1. The record 5120 is for associating data unit address information with port identification information. The controller 511 is for controlling the bridge node and processing of received data units, and is capable of querying the record 5120 for determining which of the ports P to forward a received data unit to. The bridge node 51 is arranged to initiate the previously described topology reconfiguration procedure for the data unit communication network when detecting an occurrence of any one of one or more topology reconfiguration conditions, and it is furthermore arranged to initiate the previously described dedicated purge procedure of the records of said bridge nodes when detecting an occurrence of an indication of an upcoming topology reconfiguration of said data unit communication network, and to continue handling data units during said purge procedure.

The initiating of the procedure can be done in any suitable or desirable way, e.g. by notifying a central control entity or by sending out appropriate control messages as regulated by a topology control protocol, see the examples of nodes 31 and 32 in FIGS. 7 and 8.

Figure 4:
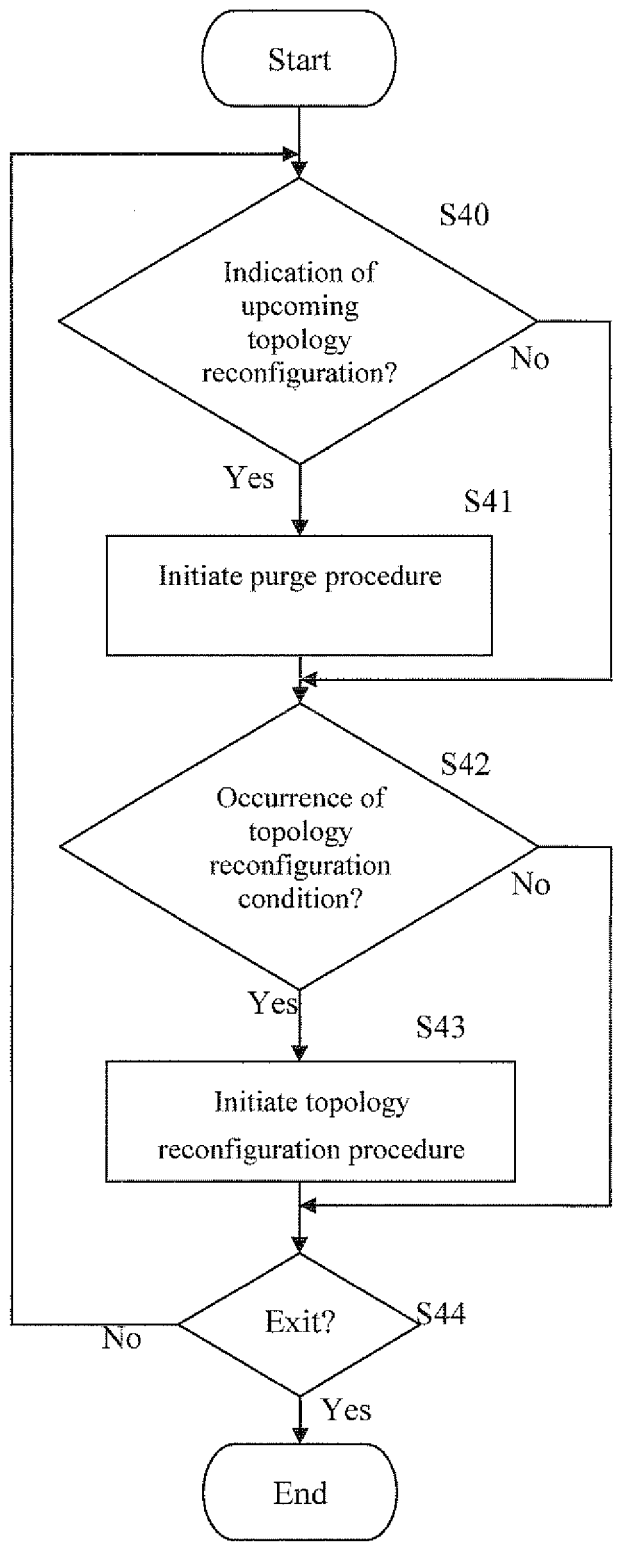
FIG. 4 shows a flowchart of an embodiment of a method of the invention relating to the control of an individual bridge node.

FIG. 4 shows a flow chart of a method for controlling a bridge node such as node 51. In step S40 it is determined whether an indication of an upcoming topology reconfiguration is present. If so (YES), then the dedicated purge procedure is initiated, see step S41. If no indication is present (NO at S40), the procedure passes to step S42, in which it is determined whether a topology reconfiguration condition is present. If such a condition is present (YES), then the topology reconfiguration procedure is initiated, otherwise (NO at S42) step S43 is skipped. The procedure continues until an exit step S44 is conducted.

The just described method of controlling a bridge node can also be embodied as a computer program comprising computer program parts arranged to conduct this method when loaded and executed on a programmable bridge node for a data unit communication network. For example, the controller 511 shown in FIG. 5 can be a programmable processor.

The invention can also be embodied as a computer program product comprising such a computer program, e.g. a data carrier comprising the program.

Although the described embodiments serve to provide a better understanding of the concepts of the present invention, the invention is by no means limited thereto, as it is defined by the appended claims. Reference signs serve to make the claims more legible, but do not have any limiting effect.

The invention claimed is:

1. Method of reconfiguring a data unit communication network that comprises bridge nodes, where each bridge node comprises two or more ports for receiving and sending data units,
    a controller for controlling said bridge node and for handling received data units, and a record for associating data unit address information with port identification information, said controller being capable of querying said record for determining which one or more ports to forward a received data unit to, the method comprising:

performing a topology reconfiguration procedure for said data unit communication network when detecting an occurrence of any one of one or more topology reconfiguration conditions, and performing a purge procedure of the records of said bridge nodes when detecting an occurrence of an indication of an upcoming topology reconfiguration of said data unit communication network, said indication being different from any of said topology reconfiguration conditions, and continuing to handle data units in said bridge nodes during said purge procedure.

2. The method of claim 1, where each bridge node is controllable to associate at least one of its ports with a learning state according to which the bridge node's record is updated on the basis of information contained in data units received at a port that is associated with said learning state, wherein said purge procedure comprises disabling said learning state for one or more of said ports of said bridge nodes.

3. The method of claim 2, wherein said topology reconfiguration procedure comprises a step of enabling said learning state for said one or more of said ports of said bridge nodes after reconfiguration.

4. The method of claim 2, comprising a step of enabling said learning state for said one or more of said ports of said bridge nodes upon expiration of a timer.

5. The method according to claim 1, wherein said bridge nodes implement a topology control protocol that uses associated topology control data units for signalling between said bridge nodes.

6. The method of claim 5, wherein each bridge node runs a first and a second instance of said topology control protocol in parallel, said first instance being arranged to conduct steps for said topology reconfiguration procedure in each respective bridge node and said second instance being arranged to conduct steps for said purge procedure in each respective bridge node.

7. The method of claim 5, wherein said purge procedure comprises sending dedicated topology control data units comprising a purge notification to said bridge nodes.

8. The method according to claim 1, wherein said one or more topology reconfiguration conditions comprise one or both of:
 failure of a component of said data unit communication network, and
 shut-down of a component of said data unit communication network.

9. The method according to one claim 1, wherein said indication of an upcoming topology reconfiguration of said data unit communication network comprises one or more of:
 signal quality degradation,
 a maintenance indication, and
 a system update indication.

10. The method according to one claim 1, wherein said bridge nodes are Medium Access Control bridges located at OSI layer 2 that interconnect Local Area Networks.

11. Method of controlling a bridge node for a data unit communication network, said bridge node comprising
 two or more ports for receiving and sending data units,
 a controller for controlling said bridge node and processing received data units, and
 a record for associating data unit address information with port identification information, said controller being capable of querying said record for determining which one or more ports to forward a received data unit to, the method comprising:

initiating a topology reconfiguration procedure for said data unit communication network when detecting an occurrence of any one of one or more topology reconfiguration conditions, and initiating a purge procedure of the records of said bridge nodes in said data unit communication network when detecting an occurrence of an indication of an upcoming topology reconfiguration of said data unit communication network, said indication being different from any of said topology reconfiguration conditions, and continuing to handle data units during said purge procedure.

12. The method of claim 11, where said bridge node is controllable to associate at least one of its ports (P) with a learning state according to which the bridge node's record is updated on the basis of information contained in data units received at a port that is associated with said learning state, wherein said purge procedure comprises disabling said learning state for one or more of said ports of said bridge nodes.

13. The method of claim 12, wherein said bridge node enables said learning state for said one or more of said ports after reconfiguration.

14. The method of claim 13, wherein said bridge node enables said learning state for said one or more of said ports upon expiration of a timer.

15. The method according to claim 11, wherein said bridge node implements a topology control protocol that uses associated topology control data units for signalling between the bridge nodes of said data unit communication network.

16. The method of claim 15, wherein said bridge node runs a first and a second instance of said topology control protocol in parallel, said first instance being arranged to conduct steps for said topology reconfiguration procedure and said second instance being arranged to conduct steps for said purge procedure.

17. The method of claim 16, wherein said bridge node sends dedicated topology control data units comprising a purge notification to other bridge nodes of said data unit communication network.

18. A bridge node for a data unit communication network, said bridge node comprising
 two or more ports for receiving and sending data units,
 a controller for controlling said bridge node and processing of received data units, and
 a record for associating data unit address information with port identification information, said controller being capable of querying said record for determining which one or more ports to forward a received data unit to, said bridge node being arranged to initiate a topology reconfiguration procedure for said data unit communication network when detecting an occurrence of any one of one or more topology reconfiguration conditions, wherein said bridge node furthermore is arranged to initiate a purge procedure of the records of said bridge nodes when detecting an occurrence of an indication of an upcoming topology reconfiguration of said data unit communication network, said indication being different from any of said topology reconfiguration conditions, and to continue handling data units during said purge procedure.

* * * * *

UNITED STATES PATENT AND TRADEMARK OFFICE
CERTIFICATE OF CORRECTION

PATENT NO. : 8,743,741 B2  
APPLICATION NO. : 12/673544  
DATED : June 3, 2014  
INVENTOR(S) : Mueller et al.

Page 1 of 1

It is certified that error appears in the above-identified patent and that said Letters Patent is hereby corrected as shown below:

In the Specification:

In Column 5, Line 11, delete "MSFT" and insert -- MSTP --, therefor.

In Column 7, Line 51, delete "purging P" and insert -- purging P of --, therefor.

In the Claims:

In Column 9, Line 52, in Claim 9, delete "to one claim" and insert -- to claim --, therefor.

In Column 9, Line 58, in Claim 10, delete "to one claim" and insert -- to claim --, therefor.

In Column 10, Line 18, in Claim 12, delete "ports (P)" and insert -- ports --, therefor.

Signed and Sealed this  
Twenty-first Day of April, 2015

Michelle K. Lee  
*Director of the United States Patent and Trademark Office*